(12) United States Patent
Myung et al.

(10) Patent No.: US 10,011,472 B2
(45) Date of Patent: Jul. 3, 2018

(54) VALVE DEVICE OF DIRECT WATERING TYPE DRINKING WATER DISPENSER

(71) Applicant: Sung Hee Myung, Suwon-si, Gyeonggi-do (KR)

(72) Inventors: Sung Hee Myung, Suwon-si (KR); Sang Kun Han, Suwon-si (KR)

(73) Assignee: Sung Hee Myung, Suwon-si, Gyeonggi-do (KR)

( * ) Notice: Subject to any disclaimer, the term of this patent is extended or adjusted under 35 U.S.C. 154(b) by 107 days.

(21) Appl. No.: 15/305,351

(22) PCT Filed: Nov. 19, 2014

(86) PCT No.: PCT/KR2014/011117
§ 371 (c)(1),
(2) Date: Oct. 20, 2016

(87) PCT Pub. No.: WO2015/170810
PCT Pub. Date: Nov. 12, 2015

(65) Prior Publication Data
US 2017/0043993 A1    Feb. 16, 2017

(30) Foreign Application Priority Data
May 7, 2014  (KR) .......................... 10-2014-0054112

(51) Int. Cl.
*B67D 1/00*     (2006.01)
*F16K 31/06*    (2006.01)
(Continued)

(52) U.S. Cl.
CPC ......... *B67D 1/0082* (2013.01); *B67D 1/0014* (2013.01); *B67D 3/0025* (2013.01);
(Continued)

(58) Field of Classification Search
USPC ............................................ 251/65; 137/801
See application file for complete search history.

(56) References Cited

U.S. PATENT DOCUMENTS

| | | | | |
|---|---|---|---|---|
| 2,752,936 A | * | 7/1956 | Cantalupo | F16K 47/02 137/414 |
| 6,003,734 A | | 12/1999 | Oh | |
| 6,607,174 B2 | * | 8/2003 | Weber | F16K 31/404 251/25 |

FOREIGN PATENT DOCUMENTS

| | | |
|---|---|---|
| KR | 10-0197690 B1 | 6/1999 |
| KR | 20-1999-0038968 U | 11/1999 |

(Continued)

OTHER PUBLICATIONS

International Search Report for PCT/KR2014/011117 dated Feb. 2, 2015 from Korean Intellectual Property Office.

*Primary Examiner* — R. K. Arundale
*Assistant Examiner* — Daphne M Barry
(74) *Attorney, Agent, or Firm* — Revolution IP, PLLC (57) ABSTRACT

A valve device of a direct watering type drinking water dispenser comprises a body unit formed with a water inlet through which the water purified by a filter is introduced, a water outlet through which the purified water is discharged, and a flow path enabling the water inlet to be in communication with the water outlet; a closing unit provided at the inside of the body unit to open or close the flow path; a lever provided inside the body unit and having one end inserted into the inside of the body unit while being rotatably hinged to the body unit; and a magnet provided at the inside of the body unit which opens the flow path by having the closing unit move upwards and be attached thereto by magnetic force when moved downward by a predetermined depth due to being pushed by the rotation of the lever.

6 Claims, 5 Drawing Sheets

(51) Int. Cl.
  *F16K 31/08*    (2006.01)
  *F16K 31/60*    (2006.01)
  *F16K 35/02*    (2006.01)
  *B67D 3/00*     (2006.01)
  *F16K 31/385*   (2006.01)

(52) U.S. Cl.
  CPC ........ *F16K 31/0655* (2013.01); *F16K 31/086* (2013.01); *F16K 31/088* (2013.01); *F16K 31/3855* (2013.01); *F16K 31/602* (2013.01); *F16K 35/025* (2013.01); *B67D 2210/0001* (2013.01); *B67D 2210/00144* (2013.01)

(56) References Cited

FOREIGN PATENT DOCUMENTS

| | | |
|---|---|---|
| KR | 10-0559480 B1 | 3/2006 |
| KR | 10-1303923 B1 | 9/2013 |

\* cited by examiner

VALVE DEVICE OF DIRECT WATERING TYPE DRINKING WATER DISPENSER

CROSS REFERENCE TO PRIOR APPLICATIONS

This application is a National Stage Application of PCT International Patent Application No. PCT/KR2014/011117 filed on Nov. 19, 2014, under 35 U.S.C. § 371, which claims priority to Korean Patent Application No. 10-2014-0054112 filed on May 7, 2014, which are all hereby incorporated by reference in their entirety.

TECHNICAL FIELD

The present invention relates to a valve device of a direct watering type drinking water dispenser, and more particularly, to a valve device of a direct watering type drinking water dispenser capable of opening/closing a flow path on which self-purified water flows without including an electronic driving unit, in a water purifier connected to a water pipe and purifying raw water.

BACKGROUND ART

Water purifying devices are used to filter raw water supplied from a raw water supply source so that a user can use the filtered raw water as drinking water or for other purposes, and a representative example of water purifying devices is a water purifier. In particular, a direct watering type water purifying device among water purifiers is a water purifying device having no water purifying tank (a tank in which purified water is stored) for storing the purified water in the device. The direct watering type water purifying device directly uses the purified water in the device. In general, the direct watering type water purifying device is installed at a sink or a drinking fountain, and a raw water inlet pipe is connected to a supply pipe of water supplies, and a purified water outlet pipe in which the raw water is filtered and purified water is discharged, is directly connected to a water outlet valve.

In the case of a water purifier having a water purifying tank, the purified water is primarily collected and is discharged through a mechanical valve or an electronic solenoid valve. Such a water purifier has a low inner pipe pressure of an internal product and thus can use the mechanical valve or a direct acting type solenoid valve. However, in the case of the direct watering type water purifier, the pressure of supplied raw water is high, 2 to 8 kgf/cm$^2$, and after the raw water is supplied to a filter using the high pressure, water in a purified state is discharged without a storage tank. Thus, the direct watering type water purifier uses a gooseneck or an electronic high-pressure solenoid valve.

However, the gooseneck has a problem of many factors limited in an installation place, and the electronic high-pressure solenoid valve essentially requires a power supply such that the structure of the water purifier is complicated. Also, because an electrical outlet for supplying power is disposed around the water purifier, a safety accident may occur when the electrical outlet is in contact with water discharged from the water purifier.

DETAILED DESCRIPTION OF THE INVENTION

Technical Problem

The present invention provides a valve device of a direct watering type drinking water dispenser capable of opening/closing a flow path on which self-purified water flows without including an electronic driving unit, in a water purifier connected to a water pipe and purifying raw water.

Technical Solution

According to an aspect of the present invention, there is provided a valve device of a direct watering type drinking water dispenser including: a body unit formed with a water inlet through which the water purified by a filter is introduced, a water outlet through which the purified water is discharged, and a flow path enabling the water inlet to be in communication with the water outlet; a closing unit provided at the inside of the body unit to open or close the flow path; a lever provided inside the body unit and having one end inserted into the inside of the body unit while being rotatably hinged to the body unit; and a magnet provided at the inside of the body unit which opens the flow path by having the closing unit move upwards and be attached thereto by magnetic force when moved downward by a predetermined depth due to being pushed by the rotation of the lever.

Effect of the Invention

A valve device of a direct watering type drinking water dispenser according to the present invention has the following effects.

First, because a flow path can be opened/closed using magnetism without including an electrical driving unit, the structure of a valve is simplified, and costs can be reduced. In particular, when magnetism of a magnet is deteriorated, the entire valve does not need to be exchanged and only the magnet has to be exchanged so that user's maintenance costs can be reduced.

Second, because a child lock unit is provided, hot water can be prevented from being easily discharged from a water purifier and thus the user's safety accident due to the hot water discharged from the water purifier can be prevented.

BEST MODE

FIGS. 1 through 5 illustrate a valve device of a direct watering type drinking water dispenser according to the present invention.

Before a detailed description of an embodiment of the present invention, an example in which the direct watering type drinking water dispenser is a direct watering type water purifier, will be described. First, referring to FIGS. 1 and 2, a valve device 100 of a direct watering type water dispenser according to an embodiment of the present invention includes body units 110 and 120, a closing unit 140, and a magnet unit 150. The body units 110 and 120 include a water inlet 111 through which water purified by a filter (not shown) is introduced, and a water outlet 113 through which the purified water is discharged, and a flow path enabling the water inlet 111 to be in communication with the water outlet 113. The body units 110 and 120 will now be described in more detail. The body units 110 and 120 include a lower body 110 and an upper body 120. The lower body 110 is formed with the water inlet 111 and the water outlet 113, and the flow path, which is formed between the water inlet 111 and the water outlet 113 and on which the purified water introduced through the water inlet 111 flows and is discharged through the water outlet 113. The closing unit 140 that will be described below is disposed at the lower body 110, and the flow path is opened or closed by the closing unit 140. This will be described in more detail when describing the closing unit 140.

Figure 1:
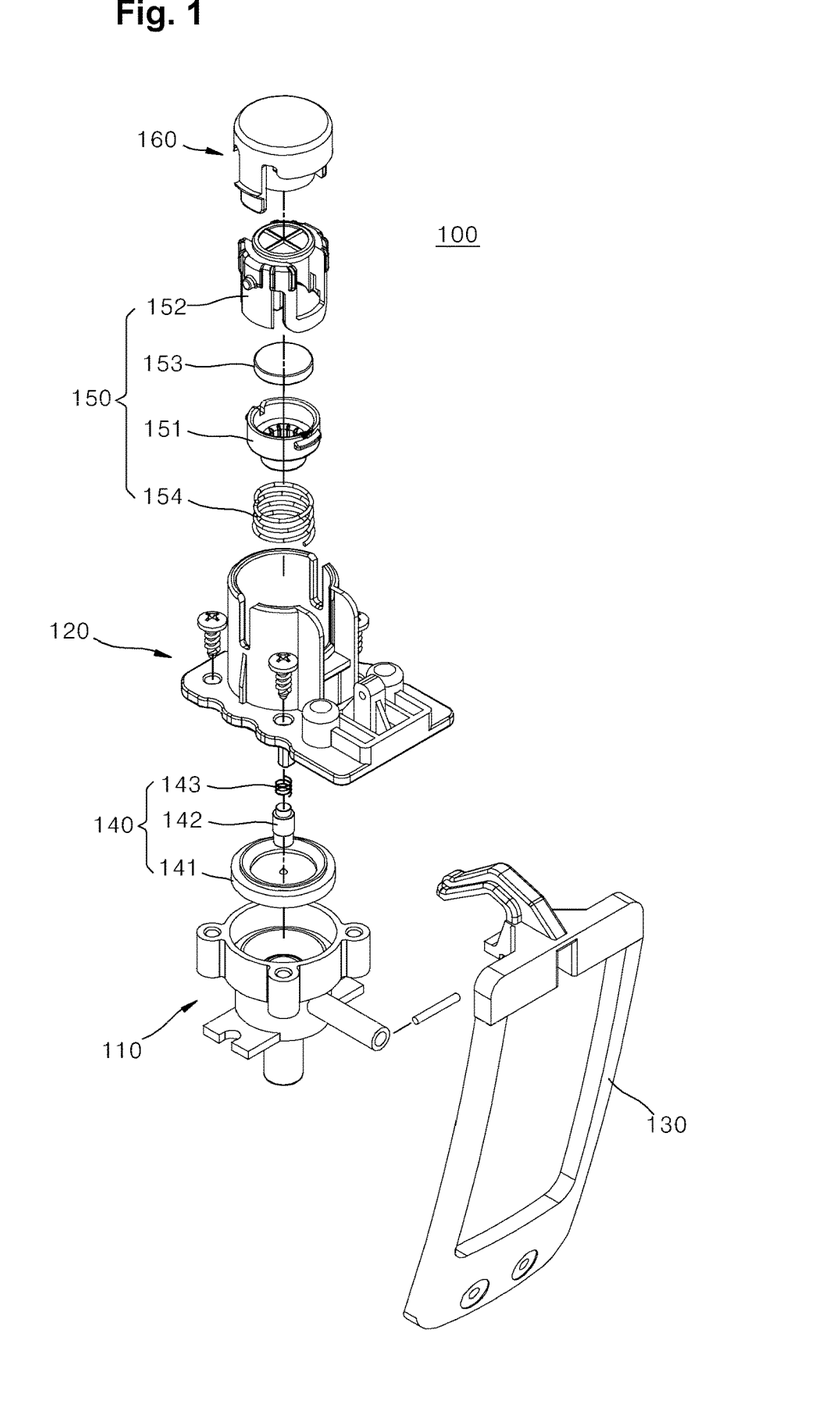
FIG. 1 is an exploded perspective view of a valve device of a direct watering type drinking water dispenser according to an embodiment of the present invention.
Figure 2:
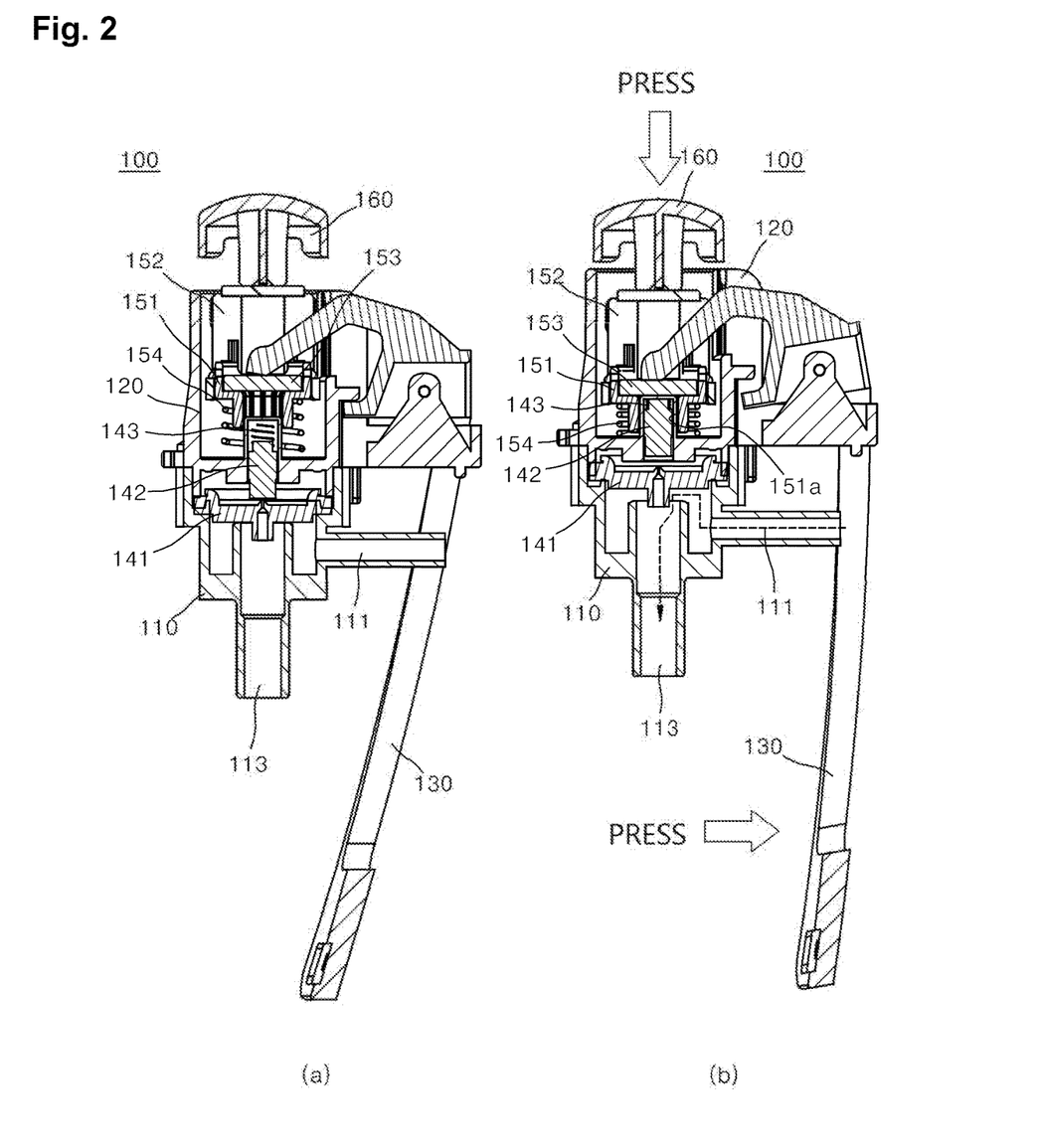
FIG. 2 is a cross-sectional view of an operating structure of the valve device of the direct watering type drinking water dispenser illustrated in FIG. 1.

The upper body 120 is detachably coupled to the lower body 110 via a fastening member. A lever 130 is rotatably hinged to one side of the upper body 120, and the flow path is opened so that the purified water can be discharged by manipulation using the lever 130. The magnet unit 150 that will be described below is disposed at the inside of the upper body 120.

The closing unit 140 is disposed at the insides of the body units 110 and 120 and opens or closes the flow path. In more detail, the closing unit 140 closes the flow path normally and opens the flow path due to an organic operating structure with the magnet unit 150. This will be described later in more detail through an operating structure of the valve device 100.

The closing unit 140 includes a diaphragm 141, a plunger 142, and a first elastic member 143. The diaphragm 141 is disposed at the inside of the lower body 110, closes the flow path normally and then, opens the flow path while being moved upwards. The plunger 142 is disposed above the diaphragm 141 and is coupled to the diaphragm 141. The plunger 142 moves the diaphragm 141 upwards while being attached to the magnet unit 150 due to a magnetic force of the magnet unit 150 that will be described below. Thus, the plunger 142 includes a metal material in such a way that the plunger 142 is easily attachable to the magnet unit 150 due to the magnetic force of the magnetic unit 150. Part of an upper side of the plunger 142 is perforated and inserted into and coupled to the upper body 120.

The first elastic member 143 may be a spring, for example. The first elastic member 143 is coupled to the upper side of the plunger 142. The diaphragm 141 is provided to close the flow path due to a tensile force of the first elastic member 143 normally. However, when the magnetic unit 150 is moved downwards due to the lever 130, the plunger 142 is moved upwards due to magnetism, and the first elastic member 143 is compressed so that the plunger 142 is attachable to the magnet unit 150.

The magnet unit 150 is disposed at the insides of the body units 110 and 120, and in particular, at the inside of the upper body 120. When the magnet unit 150 is in contact with one end of the lever 130 coupled to the body unit 110 and one end of the lever 130 presses the magnetic unit 150 due to the rotation of the lever 130 and thus the magnet unit 150 is moved downwards, the closing unit 140 is lifted due to the magnetic force and opens the flow path. The magnet unit 150 includes a magnet 153, magnet cases 151 and 152, and a second elastic member 154. The magnet 153 generates a magnetic force, lifts the plunger 142 upwards so that the plunger 142 is attached to the magnet 153. The magnet 153 is disposed at the inside of the upper body 120 while being built in the magnet cases 151 and 152. The magnet cases 151 and 152 include a lower magnet case 151 and an upper magnet case 152.

The magnet 153 is disposed in the lower magnet case 151, and the upper magnet case 152 is detachably coupled to the lower magnet case 151 and protects the magnet 153. One side of the upper magnet case 152 is opened so that one end of the lever 130 rotatably hinged to the body units 110 and 120 is inserted into the magnet cases 151 and 152 through the opened portion of the upper magnet case 152 and is in contact with the magnet 153. A hole 151a into which the plunger 142 is insertable, is formed in a lower portion of the lower magnet case 151. Thus, when the magnet unit 150 is moved downwards due to the lever 130, the first elastic member 153 is compressed, and an upper portion of the plunger 142 is inserted into the hole 151a.

The magnet 153 is an AlNiCo magnet, a ferrite magnet, and a rare earth magnet, for example. More specifically, each of the AlNiCo magnet and the ferrite magnet is classified into an isotropic type and an anisotropic type, and the rare earth magnet is classified into a neodymium magnet and a samarium cobalt magnet. Besides, a bond magnet made by pulverizing the AlNiCo magnet, the ferrirte magnet, the neodymium magnet and the samarium cobalt magnet, mixing them with resin and performing injection molding, and a rubber magnet made by pulverizing the AlNiCo magnet, the ferrirte magnet, the neodymium magnet and the samarium cobalt magnet and mixing them with rubber, may also be used as the magnet 153.

The second elastic member 154 is coupled to outer circumferential surfaces of lower portions of the magnet cases 151 and 152. The magnetic force of the magnet unit 150 is deteriorated due to a tensile force of the second elastic member 154 so that the plunger 142 is moved upwards by a height at which the plunger 142 is not in contact with the magnet 153, and is supported. Due to a compressive force of the second elastic member 154, the magnet 153 and the magnet cases 151 and 152 are moved downwards due to the rotation of the lever 130 by a height at which the plunger 142 is able to be in contact with the magnet 153. When the lever 130 returns to its initial position, due to a restoring force (tensile force) of the second elastic member 154, the magnet 153 and the magnet cases 151 and 152 are moved upwards and return to their initial positions.

Meanwhile, the valve device 100 of the direct watering type drinking water dispenser further includes a push button 160 that is disposed at an upper side of the upper body 120 and makes a reciprocal motion in a vertical direction. The valve device 100 of the direct watering type drinking water dispenser may discharge the purified water using the push button 160 in addition to the usage of the lever 130. As described above, the push button 160 is coupled to the upper side of the upper body 120 so as to make a reciprocal motion in the vertical direction. A bottom end of the push button 160 is in contact with a top end of the upper magnet case 152 of the magnet cases.

When a user presses the push button 160 to be moved downwards, the magnet cases 151 and 152 that contact the bottom end of the push button 160 are moved downwards. In this case, when the magnet 153 built in the magnet cases 151 and 152 is together moved downwards by a predetermined depth, the plunger 142 is moved upwards in a direction of the magnet 153 due to the magnetic force of the magnet 153 and is attached to the magnet 153. The diaphragm 141 coupled to the plunger 142 is also moved upwards in line with the plunger 142 and opens the flow path so that the purified water can be discharged.

An operating structure of the valve device 100 of the direct watering type drinking water dispenser having the above configuration according to an embodiment of the present invention will be described as below.

When the user pushes the lever 130 of the valve device 100 of the direct watering type drinking water dispenser, the second elastic member 154 is compressed by one end of the lever 130, i.e., one end that contacts the magnet 153 of the magnet unit 130, and the magnet cases 151 and 152 in which the magnet 153 is built, are moved downwards. When the magnet cases 151 and 152 having the magnet 153 built therein are moved downwards by a predetermined height, the plunger 142 of the closing unit 140 that closes the flow path is moved upwards due to the magnetic force of the magnet 153, the plunger 142 is attached to the magnet 153.

When the plunger 142 is moved upwards and is attached to the magnet 153, the diaphragm 141 coupled to the plunger 142 is also moved upwards, and the flow path closed by the closing unit 140 is opened so that the purified water is discharged through the water outlet 113 of the lower body 110.

When the user releases the lever 130 after allowing a desired amount of the purified water to be discharged, the lever 130 is rotated, and one end of the lever 130 that contacts the magnet 153 returns to its initial position, and the magnet cases 151 and 152 having the magnet 153 built therein return to their initial positions due to the restoring force of the second elastic member 154, and the plunger 142 returns its initial position due to the restoring force of the first elastic member 143, and the flow path is closed again.

Meanwhile, the valve device 100 of the direct watering type drinking water dispenser may discharge the purified water using the push button 160 as well as the lever 130. As illustrated in FIG. 2, when the user presses the push button 160, the magnet cases 151 and 152 that contact the bottom end of the push button 160 are moved downwards. When the magnet cases 151 and 152 are moved downwards by the predetermined height, as when the valve device 100 of the direct watering type drinking water dispenser discharges the purified water using the lever 130, due to the magnetic force of the magnet 153, the plunger 142 is moved upwards and contacts the magnet 153. In this case, the diaphragm 141 is together moved upwards, and the flow path is opened.

The user has only to allow a desired amount of the purified water to be discharged and then to remove force used to press the push button 160 such that the valve device 100 is closed in a structure in which the valve device 100 is opened and then closed by the lever 130.

Figure 3:
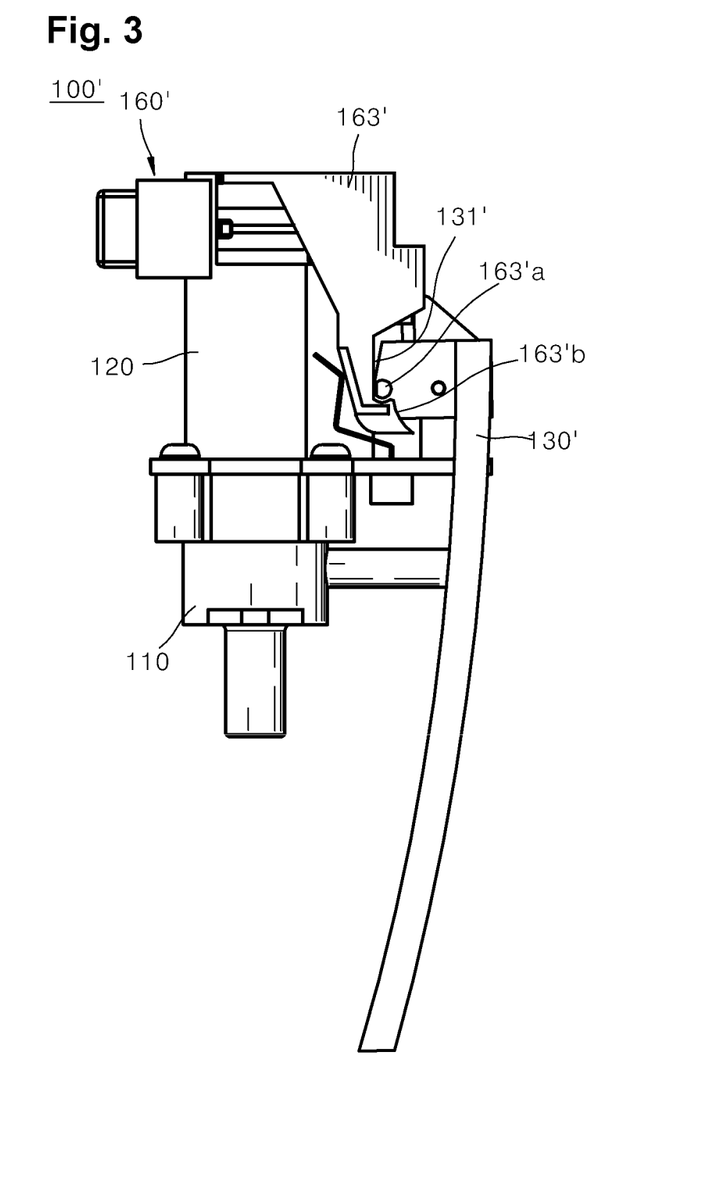
FIGS. 3 and 4 are side views of an operating structure of a valve device of a direct watering type drinking water dispenser according to another embodiment of the present invention.
Figure 4:
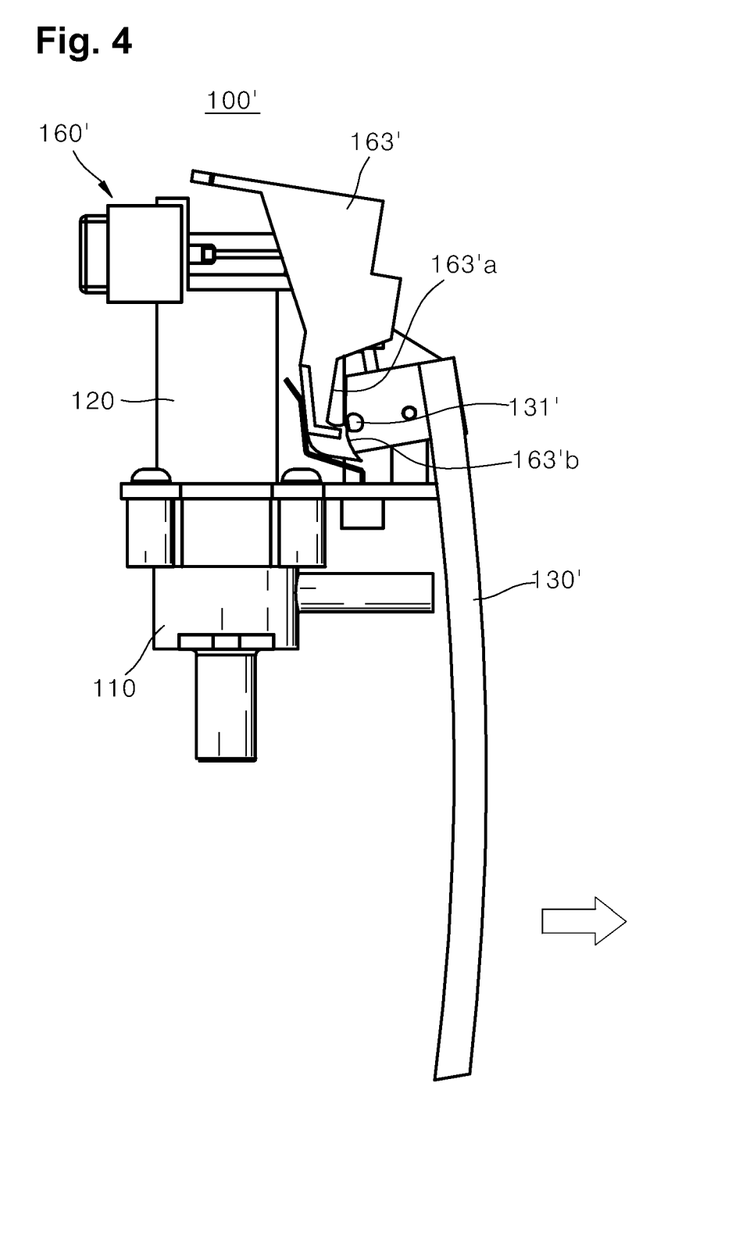
Figure 5:
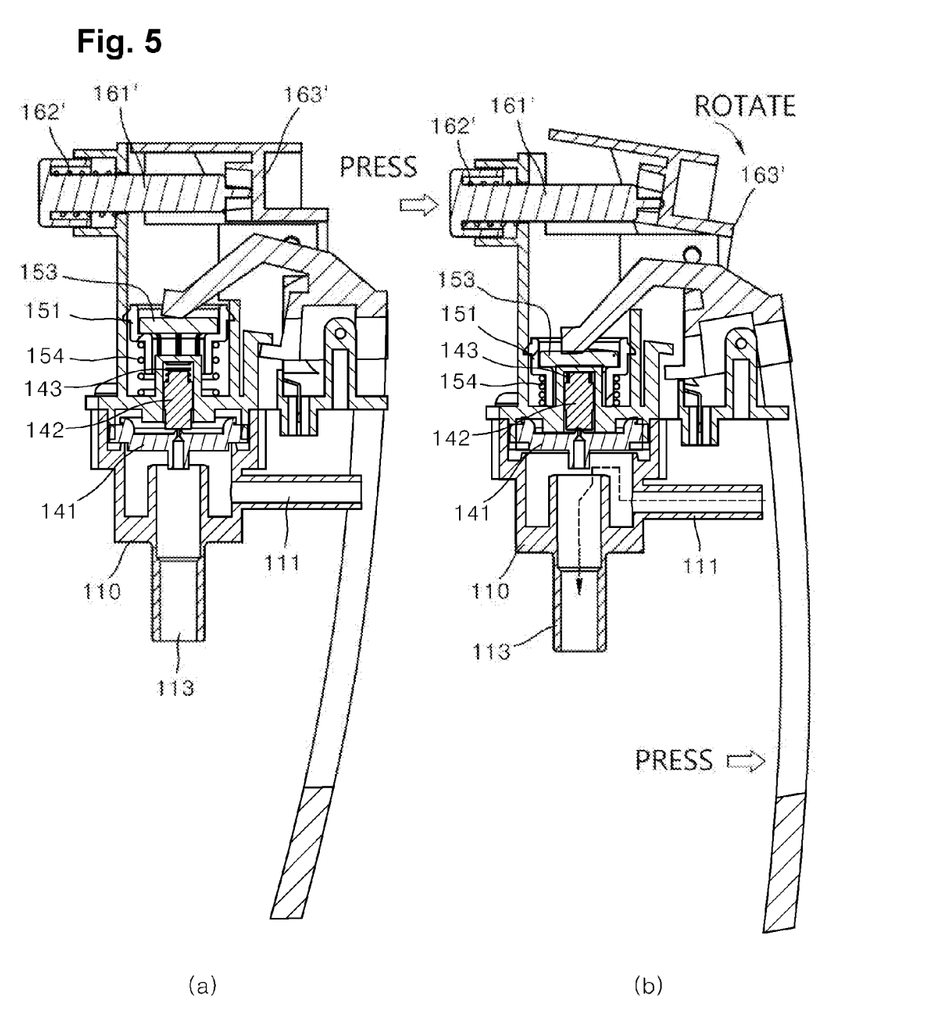
FIG. 5 is a cross-sectional view of an operating structure of the valve device of the direct watering type drinking water dispenser illustrated in FIGS. 3 and 4.

FIGS. 3 through 5 illustrate a valve device 100' of a direct watering type drinking water dispenser according to another embodiment of the present invention. The valve device 100' of the direct watering type drinking water dispenser according to the current embodiment has almost the same configuration as that of the valve device 100 of the direct watering type drinking water dispenser according to the above-described embodiment. However, the valve device 100' of the direct watering type drinking water dispenser further includes a child lock unit 160' in a state in which the push button 160 according to an embodiment is omitted. The child lock unit 160' is further included in the valve device 100' of the direct watering type drinking water dispenser so that the configuration of a lever 130' is modified. Thus, in the following description, like reference numerals are used for the same configuration as that of the valve device 100 according to the above-described embodiment, and descriptions thereof will be omitted, and only a different configuration will be described.

The valve device 100' of the direct watering type drinking water dispenser further includes the child lock unit 160', as described above. The child lock unit 160' is disposed above the body units 110 and 120, in particular, above the upper body 120 and prevents purified hot water from being discharged by only manipulation of the lever 130' so that a safety accident is prevented from occurring due to the purified hot water. For example, a burn accident when children are hurt by the purified hot water due to wrong manipulation, can be prevented in advance.

The child lock unit 160' includes a child lock button 161' and a button cover 163'. The child lock unit 161' is coupled to an upper side of the upper body 120 to make a reciprocal motion in a horizontal direction. One end of the child lock button 161' protrudes toward the upper body 120 so that the user can press the child lock button 161'. A third elastic member 162' is disposed at the inside of one end of the child lock button 161' so that, when the user presses one end of the child lock button 161', the third elastic member 162' is compressed and the child lock button 161' is moved and when the user releases the child lock button 161', due to a restoring force (tensile force) of the third elastic member 162', the child lock button 161' returns to its initial position.

The button cover 163' is in contact with the other end of the child lock button 161' and is rotatably hinged to the upper side of the upper body 120. The button cover 163' is rotated by force pushed by the child lock button 161' when the user presses the child lock button 161'. In the current embodiment, as illustrated in FIGS. 4 and 5, the button cover 163' is rotated clockwise. A hanging groove 163'$a$ and a rotation guide portion 163'$b$ are formed at a lower portion of the button cover 163'. The hanging groove 163'$a$ prevents the lever 130' from being rotated without releasing the child lock unit 160' when a hanging protrusion 131' formed at the lever 130' is hung in the hanging groove 163'$a$. The rotation guide portion 163'$b$ guides the hanging protrusion 131' of which hanging is released from the hanging groove 163'$a$ when the child lock unit 160' is released.

The lever 130' is formed to have almost the same shape as that of the above-described embodiment. In the current embodiment, the hanging protrusion 131' is further formed at the lever 130', as described above. The hanging protrusion 131' is hung in the hanging groove 163'$a$ formed at the button cover 163' of the child lock unit 160' so that, even when the user presses the lever 130', the lever 130' is prevented from being rotated. The user presses the child lock button 161' to rotate the button cover 163', and only when hanging of the hanging protrusion 131' is released from the hanging groove 163'$a$, the hanging protrusion 131' is guided along the rotation guide portion 163'$b$ so that the lever 130' can be rotated.

An operating procedure of the valve device 100' of the direct watering type drinking water dispenser having the above configuration according to another embodiment of the present invention will be described as below.

Referring to FIGS. 4 and 5, the user pushes and presses the child lock button 161' of the child lock unit 160' so as to allow the purified water to be discharged by the valve device 100'. When the user presses the child lock button 161', the button cover 163' that contacts the other end of the child lock button 161' is pushed and rotated counterclockwise.

When the button cover 163' is rotated, the hanging protrusion 131' of the lever 130' hung in the hanging groove 163'$a$ formed at the lower portion of the button cover 163' is separated from the hanging groove 163'*a*, and the lever 130' is pushed by the user. The user pushes and presses the lever 130' while pressing the child lock button 161', the hanging protrusion 131' is rotated along the rotation guide portion 163'*b* of the button cover 163'. When the lever 130' is rotated, a subsequent operating procedure is performed in the same way as that of the above-described embodiment so that the flow path is opened or closed.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

By using a valve device of a direct watering type drinking water dispenser according to the present invention, the development of a direct watering type drinking water dispenser having a simple structure and low costs can be briskly carried out.

The invention claimed is:

1. A valve device of a direct watering type drinking water dispenser comprising:
   a body unit formed with a water inlet through which the water purified by a filter is introduced, a water outlet through which the purified water is discharged, and a flow path enabling the water inlet to be in communication with the water outlet;
   a closing unit provided at an inside of the body unit to open or close the flow path;
   a lever provided at the inside of the body unit and having one end inserted into the inside of the body unit while being rotatably hinged to the body unit; and
   a magnet provided at the inside of the body unit which opens the flow path by having the closing unit move upwards and be attached thereto by magnetic force when moved downward by a predetermined depth due to being pushed by the rotation of the lever,
   wherein the body unit comprises:
   a lower body having one side at which the water inlet is formed and the other side at which the water outlet is formed and formed with the flow path enabling the water inlet and the water outlet to be in communication with each other; and
   an upper body detachably coupled to the lower body and having one side to which the lever is rotatably hinged, and
   wherein the closing unit comprises:
   a diaphragm coupled to an inside of the lower body to open or close the flow path;
   a plunger coupled to an upper side of the diaphragm and having an upper portion perforated and inserted into the upper body; and
   a first elastic member coupled to an upper side of the plunger and providing force for returning the plunger to its initial position.

2. The valve device of the direct watering type drinking water dispenser of claim 1, further comprising:
   a magnet case provided at the upper body and having a hole into which the upper portion of the plunger is inserted, wherein the magnet is built in the magnet case; and
   a second elastic member coupled to an outer circumferential surface of a lower portion of the magnet case and providing force for returning the downward-moved magnet and the magnet case to their initial positions.

3. The valve device of the direct watering type drinking water dispenser of claim 2, further comprising a push button of which part is inserted into an upper side of the upper body, which has a bottom end being in contact with a top end of the magnet case and provides force for moving the magnet unit downwards.

4. A valve device of a direct watering type drinking water dispenser comprising:
   a body unit formed with a water inlet through which the water purified by a filter is introduced, a water outlet through which the purified water is discharged, and a flow path enabling the water inlet to be in communication with the water outlet;
   a closing unit provided at an inside of the body unit to open or close the flow path;
   a lever provided at the inside of the body unit and having one end inserted into the inside of the body unit while being rotatably hinged to the body unit;
   a magnet provided at the inside of the body unit which opens the flow path by having the closing unit move upwards and be attached thereto by magnetic force when moved downward by a predetermined depth due to being pushed by the rotation of the lever; and
   a child lock unit coupled to an upper side of the body unit and locking the rotation of the lever,
   wherein the body unit comprises:
   a lower body having one side at which the water inlet is formed and the other side at which the water outlet is formed and formed with the flow path enabling the water inlet and the water outlet to be in communication with each other; and
   an upper body detachably coupled to the lower body and having one side to which the lever is rotatably hinged.

5. The valve device of the direct watering type drinking water dispenser of claim 4, wherein the child lock unit comprises:
   a child lock button having one side inserted into the inside of the upper body and the other side protruding toward an outside of the upper body and being horizontally moved;
   a button cover being in contact with the onside of the child lock button and rotatably hinged to the upper body; and
   a third elastic member provided at an inside of the other side of the child lock button and returning the horizontally-moved child lock button to its initial position.

6. The valve device of the direct watering type drinking water dispenser of claim 5, wherein a hanging protrusion is formed at one side of the lever, and a hanging groove in which the hanging protrusion is hung and fixed, is formed in a lower portion of the button cover, and a rotation guide portion through which the hanging protrusion is guided so that the lever is rotatable when the hanging and the fixing of the hanging protrusion is released.

* * * * *